(12) United States Patent
Lisowski et al.

(10) Patent No.: US 8,529,689 B2
(45) Date of Patent: Sep. 10, 2013

(54) CEMENTITIOUS COMPOSITIONS AND RELATED SYSTEMS AND METHODS

(71) Applicant: Reco Cement Products, LLC, Oconomowoc, WI (US)

(72) Inventors: David A. Lisowski, Oconomowoc, WI (US); John R. Miglautsch, Hartland, WI (US)

(73) Assignee: Reco Cement Products, LLC, Oconomowoc, WI (US)

( * ) Notice: Subject to any disclaimer, the term of this patent is extended or adjusted under 35 U.S.C. 154(b) by 0 days.

(21) Appl. No.: 13/720,467

(22) Filed: Dec. 19, 2012

(65) Prior Publication Data

US 2013/0104778 A1    May 2, 2013

Related U.S. Application Data

(62) Division of application No. 12/589,272, filed on Oct. 21, 2009, now Pat. No. 8,377,197.

(51) Int. Cl.
*C04B 18/08* (2006.01)

(52) U.S. Cl.
USPC ............ 106/705; 106/16; 106/737; 106/772; 106/DIG. 1

(58) Field of Classification Search
USPC ............ 106/713, 705, 716, 737, 772, DIG. 1; 700/265; 705/1.1, 35, 37
See application file for complete search history.

(56) References Cited

U.S. PATENT DOCUMENTS

| | | | |
|---|---|---|---|
| 530,247 A | 12/1894 | Stein | |
| 747,919 A | 12/1903 | Passow | |
| 998,358 A | 7/1911 | Lessing | |
| 1,255,236 A | 2/1918 | Schweimler et al. | |
| 2,250,107 A | 7/1941 | Nelles | |
| 2,600,515 A | 6/1952 | Mooser | |
| 2,803,556 A | 8/1957 | Carlsson et al. | |
| 2,987,406 A | 6/1961 | Minnick | |
| 3,002,843 A | 10/1961 | Stocker | |
| 3,609,316 A * | 9/1971 | Brosset et al. | 700/239 |
| 3,669,703 A | 6/1972 | Pennachetti et al. | |
| 3,854,968 A | 12/1974 | Minnick et al. | |
| 4,210,457 A | 7/1980 | Dodson et al. | |
| 4,432,800 A | 2/1984 | Kneller | |
| 4,756,761 A | 7/1988 | Philip et al. | |
| 4,761,183 A | 8/1988 | Clarke | |

(Continued)

OTHER PUBLICATIONS

International Preliminary Report on Patentability dated Oct. 18, 2011 in International Application No. PCT/US10/02042.

(Continued)

*Primary Examiner* — Paul Marcantoni
(74) *Attorney, Agent, or Firm* — Ryan Kromholz & Manion, S.C.

(57) ABSTRACT

Provided are cementitious compositions and related systems and methods. The cementitious compositions, or admixtures, according to the present invention generally comprise gypsum, a first alkaline component and glass. The admixture may further comprise fly ash, which is preferably obtained as a waste by-product from a coal-burning power plant. A method according to the present invention comprises an initial step of analyzing or receiving an analysis of a fly ash sample. Based at least in part on the analysis of the fly ash sample, a mix rate may be selected and an initial admixture can be formulated, which, when added to the fly ash sample, creates an alternative or additive to Portland cement for use in concrete, for example.

13 Claims, 4 Drawing Sheets

(56) References Cited

U.S. PATENT DOCUMENTS

| | | | |
|---|---|---|---|
| 4,992,102 A | 2/1991 | Barbour | |
| 5,041,630 A | 8/1991 | Patel et al. | |
| 5,106,422 A | 4/1992 | Bennett et al. | |
| 5,266,111 A | 11/1993 | Barbour | |
| 5,383,521 A | 1/1995 | Onan et al. | |
| 5,426,807 A | 6/1995 | Riddle | |
| 5,435,843 A | 7/1995 | Roy et al. | |
| 5,439,518 A | 8/1995 | Francis et al. | |
| 5,518,540 A | 5/1996 | Jones, Jr. | |
| 5,527,387 A * | 6/1996 | Andersen et al. | 106/693 |
| 5,565,028 A | 10/1996 | Roy et al. | |
| 5,573,588 A | 11/1996 | Carrasquillo | |
| 5,853,475 A | 12/1998 | Liskowitz et al. | |
| 5,965,201 A | 10/1999 | Jones, Jr. | |
| 6,482,258 B2 | 11/2002 | Styron | |
| 6,645,290 B1 | 11/2003 | Marcantoni | |
| 6,730,161 B2 | 5/2004 | Lakshmanan et al. | |
| 6,733,583 B2 | 5/2004 | Frailey | |
| 6,802,898 B1 | 10/2004 | Liskowitz et al. | |
| 7,284,930 B2 | 10/2007 | Shi et al. | |
| 7,347,896 B2 | 3/2008 | Harrison | |
| 7,386,368 B2 * | 6/2008 | Andersen et al. | 700/265 |
| 8,377,197 B2 * | 2/2013 | Lisowksi et al. | 106/705 |
| 2003/0041785 A1 | 3/2003 | Harrison | |
| 2003/0131759 A1 | 7/2003 | Francis | |
| 2006/0185560 A1 | 8/2006 | Ramme | |
| 2006/0201395 A1 | 9/2006 | Barger et al. | |
| 2006/0287773 A1 * | 12/2006 | Andersen et al. | 700/265 |
| 2006/0288909 A1 | 12/2006 | Naji et al. | |
| 2007/0000412 A1 | 1/2007 | Lin | |
| 2008/0066655 A1 | 3/2008 | Fraser | |
| 2008/0183523 A1 | 7/2008 | Dikeman | |
| 2009/0120644 A1 | 5/2009 | Roddy et al. | |
| 2009/0158969 A1 | 6/2009 | Andersen et al. | |
| 2010/0083880 A1 | 4/2010 | Constantz et al. | |

OTHER PUBLICATIONS

International Search Report and Written Opinion dated Dec. 3, 2010 in International Application No. PCT/US10/02042.
Web pages, www.fhwa.dot.gov/infrastructure/materialsgrp/flyash. htm, "Fly Ash", dated Sep. 28, 2009.
Web pages, www.fhwa.dot.gov/infrastructure/materialsgrp/setretrd. htm, "Set-Retarding", dated Sep. 28, 2009.
Web pages, www.fhwa.dot.gov/infrastructure/materialsgrp/cement. htm, "Portland Cement", dated Sep. 28, 2009.
Jim Doyle, Clean Energy Wisconsin—A Plan for Energy Independence, 2008.
Tyler Hamilton, A Concrete Fix to Global Warming, 2008.
Tarun R. Naik et al., Pavement Construction with High Volume Class C and Class F Fly Ash Concrete, 1995.
Bustard et al,., Concrete Applications Using High Carbon Fly Ash from the TOXECON Baghouse, 2009.
Thomas Content WP&L vows to offset coal plant emissions, 2008.
Tia Nelson and Roy Thilly, Wisconsin's Strategy for Reducing Global Warming, 2008, 4 pages.
Tarun R. Naik, Recycling of Coal-Combustion Products in Cement-Based Construction Materials, 2008, 77 pages.
Brad Fullmer, Change of Perception—Fly Ash Has Come a Long Ways in 30 Years, 2008, 5 pages.
Wally Johnson, Concrete Manufacturing Reduces CO2 Emissions with EF Technology, 2007, 3 pages.
James R. Rosehmerkel, Waukesha County Airport/Crites Field Waukesha, WI—A Case Study, 2007, 6 pages.
Bruce W. Ramme, Thomas J. Jansen, Al Tawil, In-Situ Mixed Concrete with 93% to 100% Recycled Content: We Energies "Eco-Pad" Pavement, 2007, 19 pages.
Mark Anderson and Maj. Dov Dover, Bonded Fly Ash: A Low-Energy Replacement for Portland Cement Concrete to Improve Resistance to Chem-Bio Intrusion, 2002, 12 pages.
Kedsarin Pmraksa, Matthias Wilhelm, Michael Kochberger and Werner Wruss, A New Approach to the Production of Bricks Made from 100% Fly Ash, 2001, 18 pages.

Tarun R. Naik and Zichao Wu, Crushed Post-Consumer Giass as a Partial Replacement of Sand in Concrete, 2001, 18 pages.
Tarun R. Naik, Shiw S. Singh and Bruce R. Ramme, Time of Setting as Influenced by Pozzolanic Materials and Chemical Admixtures, 2001, 24 pges.
Ruud Meij, Esther Kokmeijer, Leendert Tamboer and Henk te Winkel, Field Leeching of Bricks and Concrete Containing Coal Fly Ash, 2001, 31 pages.
P. Kumar Mehta, Reducing the Environmental Impact of Concrete, 2001, 6 pages.
P. Kumar Mehta and Richard W. Burrows, Building Durable Structures in the 21st Century, 2001, 7 pages.
Tutunlu Fatih and Atalay Umit, Utilization of Fly Ash in Manufacturing Building Bricks, 2001, 6 pages.
Bruce Ramrne, WeEnergies Coal Combustion Products Utilization Handbook, Chapter 4, Concrete and Concrete Masonry Products Containing We Energies Fly Ash, 2000, 34 pages.
Michael E. Sutton, Autoclaved Cellular Concrete, the Future of Fly Ash, 1999, 6 pages.
Tarun R. Naik, Rudolph N. Kraus, Bruce W. Rarnme, Fifteen-Year Performance of High-Column Fly Ash Concrete Roads, 1999, 1 page.
Ron Middlebrook, High Volume Flyash Concrete, 1998, 3 pages.
Tarun R. Naik, Rudolph N. Kraus, Bruce W, Ramme, Development of Dry-Cast and Wet-Cast Concrete Products Utilizing Fly Ash, Bottom Ash, and Used Foundry Sand, 1998, 55 pages.
P. Kumar Mehta, Role of Flyash in Sustainable Development— BuildingGreen.com, 1998, 12 pages.
Charles J. Nemmers, P.E., Coal Fly Ash—User Guideline—Portland Cement Concrete, 1997, 8 pages.
Tarun Naik, Shiw Singh and M. Hossain, Abrasion Resistance of Concrete as Influenced by Inclusion of Fly Ash, 1994, 1 page.
Tarun Naik, Shiw Singh and Wenyi Hu, High-Volume Fly Ash Concrete Technology Development, 1992, 1 page.
Tarun Naik and Shiw S. Singh, Superplasticized Structural Concrete Containing High Volumes of Class C Fly Ash, 1991, 12 page.
Tarun Naik, Lyle Sohns and Bruce Ramme, High Strength Fly Ash Concrete for Prestressed Concrete Products, 1990, 1 page.
Tarun R. Naik and Bruce W. Ramme, Effects of High-Lime Fly Ash Content on Water Demand, Time of Set, and Compressive Strength of Concrete, 1990, 9 pages.
Tarun R. Naik, Shiw S. Singh and Vasanthy Sivasundaram, Abrasion Resistance of Concrete as a Function of Inciusion of Fiy Ash and Temperature, 1991, 26 pages.
Tarun R. Naik and Bruce W. Ramme, High Strength Concrete Containing Large Quantities of Fly Ash, 1989, 11 pages.
Tarun Naik and Bruce Ramme, Freezing and Thawing Resistance of Concrete Incorporating Class C Fly Ash, 1984, 1 page.
Andreas Nataatmadja, Development of Low-Cost Fly Ash Bricks, 2007, 13 pages.
Gregory L. Majkrzak II, James P. Watson, Mark M. Bryant and Kip Clayton, Effect of Cenospheres on Flyash Brick Properties, 2007, 6 pages.
Koukouzas et al., Greek Fly Ash as a Cement Replacement in the Production of Paving Blocks, 2007, 12 pages.
L.K. Crouch, Ryan Hewitt and Ben Byard, High Volume Fly Ash Concrete, 2007, 14 pages.
Chugh et al., Demonstration of CFB Ash as a Cement Substitute in Concrete Pier Foundations for a Photo-Voltaic Power System at SIUC, 2007, 8 pages.
Denise Brehm, Nanoengineered Concrete Could Cut CO2 Emissions, 2007, 3 pages.
John E. Anderson, Green Cement: Finding a solution for a sustainable cement industry, 2007, 11 pages.
Richard Szecsy, Using High-Volume Flyash Concrete, 2006, 3 pages.
Mark Reiner and Kevin Kens, High-Volume Fly Ash Concrete: Analysis and Application, 2006, 1 page.
Ana M. Fernandez-Jimenez, Angel Palorm and Cecilio Lopez-Hombrados, Engineering Properties of Alkali-Activated Fly Ash Concrete, 2006, 3 pages.
G. Skodras, D. Karangelos, M. Anagnostakis, E. Hinis, P. Grammelis and E. Kakaras, Coal Fly-Ash Utilization in Greece, 2005, 18 pages.
Henry Liu, Williams Burkett, and Kirk Haynes, Improving Freezing and Thawing Properties of Fly Ash Bricks, 2005, 17 pages.

Yasar et al., High Strength Lightweight Concrete Made with Ternary Mixtures of Cement-Fly Ash-Silica Fume and Scoria as Aggregate, 2004, 6 pages.

Joseph Nasvik and Mike Pistilli, Are We Placing Too Much Air in Our Concrete, 2004, 3 pages.

Michelle Wilson, The Essentials of SCMs, 2004, 5 pages.

P. Kumar Mehta, High-Performance, High-Volume Fly Ash Concrete for Sustainable Development, 2004, 12 pages.

Robert Rathbone, Ammonia Release from Concrete Containing Ammoniated Fly Ash, 2003, 23 pages.

Alex Mishuloyich and James L. Evanko, Ceramic Tiles from High-Carbon Fly Ash, 2003, 9 pages.

Lee Ann Paradise, David Petechuk, Leslie Mertz, Is Fly Ash an Inferior Building and Structural Material, 2003, 2 pages.

Mei-In Chou and Francois Botha, Manufacturing Commercial Bricks with Illinois Coal Fly Ash, 2003, 22 pages.

Tarun R. Naik, Shiw S. Singh and Bruce W. Ramme, Effect of Source of Fly Ash on Abrasion Resistance of Concrete, 2002, 36 pages.

\* cited by examiner

CEMENTITIOUS COMPOSITIONS AND RELATED SYSTEMS AND METHODS

RELATED APPLICATIONS

This application is a divisional of co-pending U.S. patent application Ser. No. 12/589,272 filed 21 Oct. 2009.

BACKGROUND OF THE INVENTION

The present invention generally relates to mixture compositions and more specifically to cementitious compositions.

Cementitious compositions are utilized as binders in various materials. One type of cementitious composition is Portland cement, which is manufactured for use, among other things, as a binder in concrete. The manufacture of Portland cement generally requires large-scale production facilities, and the process requires heating limestone to 2000 degrees in gas powered kilns. Portland cement production is estimated to release into the atmosphere about one pound of carbon dioxide for every pound of Portland cement produced.

Coal power plants produce as much as fifty percent of the electrical power consumed in the United States. The Portland cement production process and the coal-burning electrical power generation process produce carbon dioxide as a waste product. Coal burning power plants are the single biggest producers of carbon dioxide, collectively. In addition to the considerable carbon dioxide production, coal-burning power plants produce other byproducts such as fly ash. It is estimated that coal-burning power plants produce over 80,000,000 tons of ash per year, most of which is placed in some form of landfill, or lagoon. In the United States, it is estimated that approximately two thirds of coal combustion byproducts are simply disposed of, generally in landfills, and environmental agencies are concerned about proper disposal.

Landfills are overflowing with ash, figuratively and literally. On Dec. 22, 2008, in Kingston, Tenn., a Tennessee Valley Authority power plant ash lagoon broke, spilling 5.4 million cubic yards of ash and sludge. The cleanup was projected to cost $500-$800 million. In January 2009, Constellation Energy settled for $54 million to address issues caused by their use of a gravel pit to dispose of unused fly ash. The Environmental Protection Agency estimates that there are nearly 1300 unregulated ash ponds or lagoons. Due in part to the Tennessee spill and the environmental stance of the new administration, the EPA has promised to introduce new regulations governing the disposal of coal-combustion by-products by the end of 2009. Also, to absorb the relative risk of such catastrophes, disposal costs have been rising and will be certain to rise dramatically as traditional, unregulated options must be phased out. Current disposal costs are generally about thirty to fifty dollars per ton of ash.

Instead of simply disposing of ash in a landfill, the ash may be put to some use. However, utilization of fly ash, such as in concrete, is generally low. It is estimated that only about ten percent of all of the 80,000,000 tons of ash per year is used in concrete. The reasons for such low utilization in concrete are varied. One reason is the relative lack of consistency of generated fly ash. Presently, most power plants are optimized to run on the lowest cost per megawatt of power generated, while keeping in mind all regulatory mandates. To reduce cost of production, power plants may buy a wide variety of coal to obtain low prices on the spot market. Further, power companies often contract with third party recycling companies to dispose of or market their byproducts. All of these issues create variations in the quality and usability of the byproducts. In addition, though power plants produce ash generally constantly, much of the construction industry is seasonal, especially in northern climates. Thus, while there are other uses for fly ash, such as soil stabilization, flowable fill, asphalt additive, and traffic base, when concrete demand slumps, generated ash is generally not utilized, and must be disposed of. Indeed, these alternate uses further complicate any effort to track where the ash is being used, and whether the ash is being used in an application thereby reducing a carbon footprint, such as by replacing some Portland cement.

Portland cement has been used in concrete for nearly two centuries. However, the concept of using some form of ash in a cementitious composition is an even older technique. Indeed, Roman cement, used in such buildings as the Pantheon in Rome, built around 123 A.D. featuring a 142 foot dome including neither rebar nor Portland cement, is thought to have employed a combination of two parts volcanic ash and one part lime. The cementitious composition used in constructing the Hoover dam employed the addition of fly ash from coal fired power plants for added strength. The Sears Tower (now the Willis Tower) in Chicago is estimated to have approximately thirty percent fly ash in its cementitious composition and the Dubai Tower is estimated to have approximately forty percent fly ash in its cement.

Though ash has been used in cement since Roman times and has even been used where high strength is necessary, there is a perception that it adulterates Portland cement. This perception has some basis in fact. Indeed, prior attempts have been concerned with determining an amount of fly ash that may be added to replace a minority portion of Portland cement in a cementitious mixture, rather than substantially replacing it. In such a case, there is usually a point of diminishing returns, and the addition of additional fly ash will retard and/or weaken the resulting cement. As mentioned earlier, coal fired power plants are designed and run to generate inexpensive electricity; they are not optimized for production of consistent, high-quality fly ash. Consequently, fly ash can vary in quality even from the same plant burning different source coal as well as different plants burning the same coal. To temper variations, some regulatory agencies have enacted specific rules. For instance, if fly ash is to be used in road construction in Texas, the Texas Department of Transportation requires that the ash must be supplied from the same source for an entire project. However, as a plant shuts down or starts up, its coal burning effectiveness and its ash can change.

In addition to coal and plant variations, the actual coal-burning process, which must be carried out to meet air quality regulations, may affect the quality of the resulting ash. For instance, regulations that limit the amount of nitrous oxide that can be produced also indirectly usually reduce the temperature at which coal is burned at a given power plant, thus leaving some coal in its unburned state. This loss of ignition (LOI) carbon is captured with the fly ash, and it significantly reduces the effectiveness of air entrainment chemicals used in Portland cement, which are used to improve its strength in a freezing and thawing environment. LOI carbon of even 3% in a cementitious mixture comprising only 20% ash can still significantly reduce the air entrainment of the concrete.

Though there may not be a current viable method for reducing carbon dioxide emissions of coal-fired power plants, the possibility exists for using the byproducts thereof to create an alternative to Portland cement. The net effect would be a considerable reduction in aggregate carbon dioxide generation. On the other hand, if coal-fired power plant byproducts continue to be simply relegated to a land fill, no beneficial reduction in carbon dioxide emissions will occur.

Consequently, if more fly ash that is produced by coal-burning power plants can be put to a constructive use, despite its variability, less fly ash will be subject to disposal in landfills. Also, to the extent that cementitious compositions incorporating fly ash can be used as a replacement for Portland cement, such use will reduce the amount of carbon dioxide released by Portland cement production.

SUMMARY OF THE INVENTION

Embodiments of the present invention include improved cementitious compositions and related systems and methods.

A composition according to the present invention preferably includes greater than zero and less than about thirty-three percent by weight of gypsum, greater than zero and less than about thirty-three percent by weight a first alkaline component comprising calcium oxide, and greater than zero and less than about thirty-three percent by weight glass. The composition may further comprise up to about four percent by weight set retarder. The gypsum is preferably provided a bit moist, having a moisture content of approximately 12-16%, and more preferably of about 14%.

The first alkaline component may further comprise up to ninety percent by weight calcium carbonate, up to seventy percent by weight calcium hydroxide, up to fifty percent by weight calcium magnesium carbonate, up to fifty percent by weight calcium magnesium oxide, up to five percent by weight magnesium carbonate, and up to ten percent by weight silica.

The first alkaline component may be dolomitic or calcitic lime kiln dust, quicklime, or lye.

A composition according to the present invention may, in addition to the gypsum, first alkaline component and glass, further comprise greater than or equal to fifty percent and less than or equal to eighty percent by weight class C fly ash. For instance, one composition using class C fly ash may include greater than or equal to fifty-five percent and less than or equal to seventy-five percent by weight class C fly ash, greater than zero and less than or equal to twenty percent by weight gypsum, greater than zero and less than or equal to twenty percent by weight first alkaline component, greater than zero and less than or equal to twenty percent by weight glass, and greater than or equal to zero and less than or equal to two percent by weight retarder.

Another embodiment of a composition using class C fly ash may include greater than zero and less than or equal to twenty percent by weight gypsum, greater than zero and less than or equal to twenty percent by weight first alkaline component, greater than zero and less than or equal to fifteen percent by weight glass, greater than or equal to zero and less than or equal to two-and-one-half percent by weight set retarder, and up to about fifteen percent by weight of a second alkaline component, where the second alkaline component may consist of essentially calcium oxide.

Still another embodiment of a composition using class C fly ash may include greater than or equal to fifty percent and less than or equal to seventy percent by weight class C fly ash, greater than zero and less than or equal to twenty percent by weight gypsum, greater than zero and less than or equal to twenty percent by weight first alkaline component, greater than zero and less than or equal to fifteen percent by weight glass, greater than or equal to zero and less than or equal to two-and-one-half percent by weight set retarder, and up to about fifteen percent by weight Portland cement.

A composition according to the present invention may, in addition to the gypsum, first alkaline component and glass, further comprise greater than or equal to forty-five percent and less than or equal to sixty-five percent by weight class F fly ash. For instance, one composition using class F fly ash may include greater than or equal to fifty percent and less than or equal to sixty-five percent by weight class F fly ash, greater than zero and less than or equal to twenty-five percent by weight gypsum, greater than zero and less than or equal to twenty-five percent by weight first alkaline component, and greater than zero and less than or equal to fifteen percent by weight glass.

Another embodiment of a composition using class F fly ash may include greater than or equal to fifty percent and less than or equal to sixty-five percent by weight class F fly ash, greater than zero and less than or equal to twenty-five percent by weight gypsum, greater than zero and less than or equal to twenty-five percent by weight first alkaline component, greater than zero and less than or equal to fifteen percent by weight glass, and up to about fifteen percent by weight of a second alkaline component, where the second alkaline component consists essentially of calcium oxide.

Still another embodiment of a composition using class F fly ash may include greater than or equal to forty-five percent and less than or equal to fifty-five percent by weight class F fly ash, greater than zero and less than or equal to twenty-five percent by weight gypsum, greater than zero and less than or equal to twenty-five percent by weight first alkaline component, greater than zero and less than or equal to fifteen percent by weight glass, and up to about twenty-five percent by weight Portland cement.

A method of forming a cementitious composition according to the present invention includes the steps of determining an ash weight of fly ash sample and selecting a mix strength of greater than or equal to 0.15 and less than or equal to 0.50. An ash rate is calculated by subtracting the mix rate from 1.00, and a first intermediate factor is calculated by dividing the mix rate by the ash rate. An admixture total weight can be calculated by dividing the ash weight by the ash rate and a mix weight can be calculated by multiplying the total weight by the mix rate. A rate adjustment factor is calculated by dividing a first ash factor less than one by the sum of one plus the intermediate factor. A mix factor is calculated by subtracting the rate adjustment factor from the mix rate. Based on the mix factor, selections can be made of a first weight of gypsum, a second weight of a first alkaline component and a third weight of glass, wherein the sum of the first weight, the second weight, and the third weight equals the mix weight.

In one embodiment of the method of forming a cementitious composition according to the present invention, the first ash factor is calculated by summing a first number and a second number, where the first number is a measured percent by weight of calcium oxide contained in the sample of fly ash, and the second number is a measured percent by weight of magnesium oxide contained in the sample of fly ash. The first number and second number may be measured as a part of the method or provided on a report having already been measured. An embodiment of the method may further include the step of combining the first weight of gypsum, the second weight of first alkaline component and the third weight of glass. Another embodiment may include the step of combining the ash weight of the fly ash sample with the first weight of gypsum, the second weight of first alkaline component and the third weight of glass.

In one embodiment of the method of forming a cementitious composition according to the present invention, the ash weight is determined by weighing the ash sample, while in other embodiments the weight may be provided, without the need to weigh.

Additionally or alternatively, the selection of the mix strength may be at least partially based on a metal oxide content of the fly ash sample.

Another method according to the present invention includes the steps of forming a first mixture by placing a first weight of fly ash, a second weight of gypsum, a third weight of a first alkaline component, and a fourth weight of glass in a mixer, and mixing said first mixture in said mixer, perhaps for a predetermined amount of time, to form an admixture. An embodiment of such method may further include the step of placing the fly ash into the mixer prior to placing any of the gypsum, the first alkaline component and the glass in the mixer. Alternatively or additionally, such method may include the step of weighing said fly ash either before it is transferred to the mixer or after it has been transferred to the mixer while still in the mixer. Alternatively or additionally, such method may further include the steps of weighing each of the gypsum, the first alkaline component and the glass before placing each of them in the mixer. Such weighing steps may be performed on a single scale.

Another method according to the present invention includes the step of forming a cementitious admixture including greater than zero and less than about thirty-three percent by weight gypsum, greater than zero and less than about thirty-three percent by weight a first alkaline component comprising calcium oxide, greater than zero and less than about thirty-three percent by weight glass, greater than about forty-five and less than about seventy-five percent by weight fly ash, and up to about four percent by weight set retarder. A first mortar mixture is formed consisting essentially of a first predetermined cement weight of ordinary Portland cement, a first predetermined weight of water; and a first predetermined weight of sand. A first compressive strength of the first mortar is then determined. A second mortar mixture is formed consisting essentially of a second predetermined cement weight of the cementitious admixture, a second predetermined weight of water substantially the same as the first predetermined weight of water; and a second predetermined weight of sand substantially the same as said first predetermined weight of sand. A second compressive strength of the second mortar mixture is then determined. If the second compressive strength is greater than ninety percent of the first compressive strength, the first predetermined cement weight is divided by the second predetermined cement weight to calculate a carbon impact number.

Another embodiment of such method may include the step of multiplying the carbon impact number by a number of tons of the cementitious admixture to calculate a carbon credit value, which may be sold, traded, exchanged, or otherwise used to offset carbon dioxide production for a facility such as a coal burning power plant.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Embodiments of the present invention are directed to a cementitious admixture and related systems and methods. The admixture is a cementitious product that substantially reduces the use of, and may even eliminate the need for, Portland cement. The cementitious product utilizes coal-fired power plant byproducts thereby reducing disposal costs and requirements.

Figure 1:
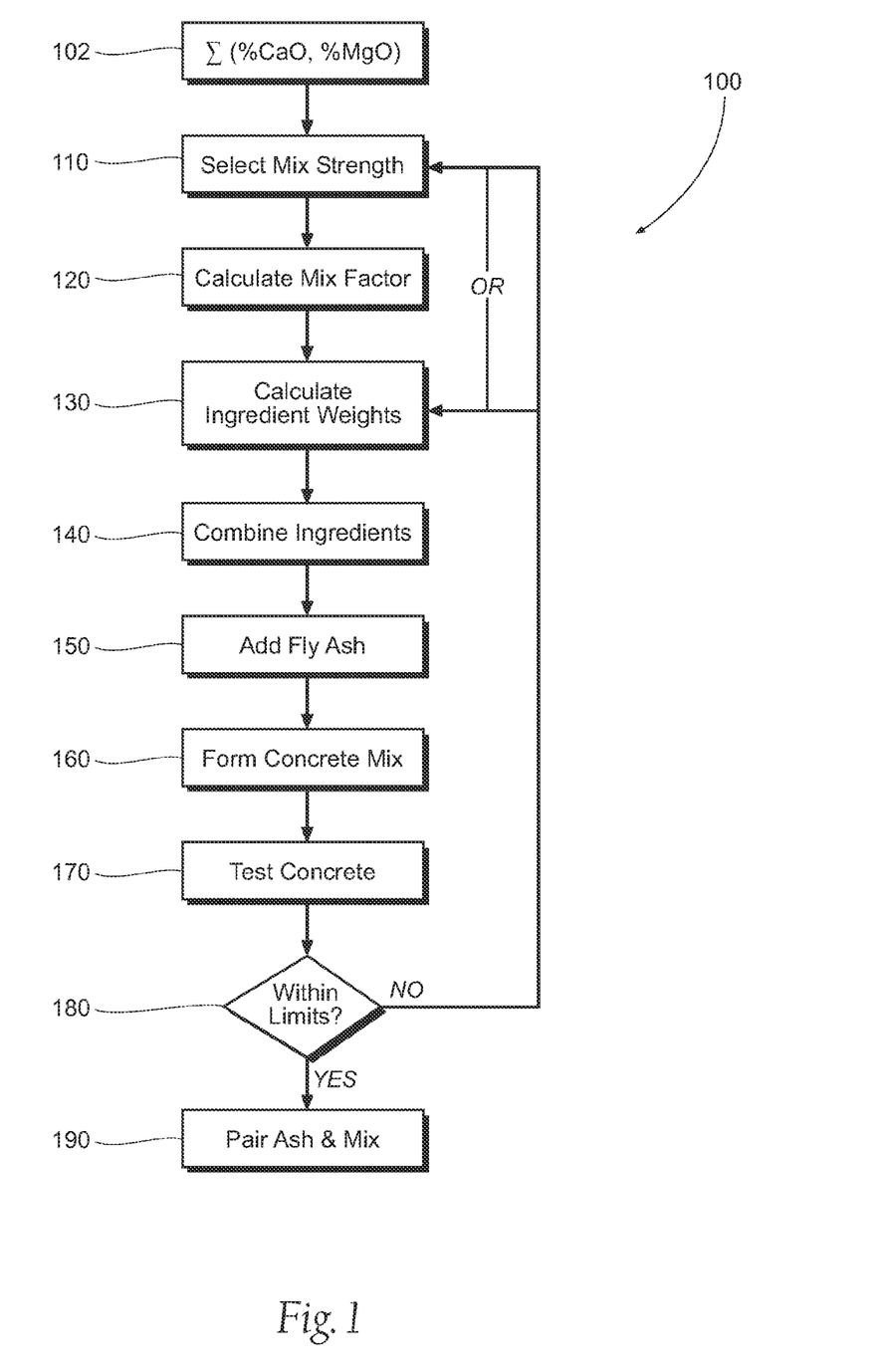
FIG. 1 is a flow chart of a method of formulating an initial cementitious admixture according to the present invention.

Turning now to a method of forming an initial admixture, the method is generally depicted in the flowchart of FIG. 1. As stated above, most coal-fired power plants are not designed or operated for consistent fly ash. In order to achieve the objectives of this invention, a preferred first step in formulating an initial admixture is to analyze, or receive an analysis of, a fly ash sample from a given coal-fired power plant, or even a particular coal-burning unit within a particular power plant. The preferred analysis is carried out under the American Society for Testing and Materials (ASTM) Part 4.02 Method C311 or ASTM C618. Generally, there are two main classifications of fly ash under the ASTM and equivalent standards, such as the American Association of State Highway and Transportation Officials (AASHTO) M 295, Class C and Class F. The physical and chemical properties of the two classes vary, and both have strengths and weaknesses. Admixtures according to the present invention may utilize a blending of these and other materials. Generally, Class C fly ash is fly ash that contains less than or equal to eighty percent by weight (% w/w) metal oxides and Class F fly ash contains greater than eighty percent by weight metal oxides, as per the specifications.

Initial testing is preferably carried out by a team of lab technicians and/or engineers. A single ash sample may be analyzed, but preferably a plurality of samples, taken on a timed basis from each of the electrostatic or filter collectors individually in a power plant, is analyzed. Furthermore, a plurality of samples is preferably examined if the coal-fired power plant is buying from more than one coal source. In that event, it may be advantageous to include ash samples from units burning coal from each coal source. The plurality of ash samples are preferably evaluated for consistency by chemical composition, particle size, carbon content, calcium content as well as other characteristics. In any event, at least the magnesium oxide (MgO) and calcium oxide (CaO) concentrations by weight (% w/w) of the fly ash sample are determined.

Once the concentrations of MgO and CaO of a fly ash sample are known, an initial admixture may be formulated. Turning again to FIG. 1, a preferred method for formulating an admixture composition may be carried out by summing 102 the MgO and CaO percentages, represented as decimals, to obtain a first ash factor that is less than one. Based on the ash factor and the classification of ash, either as class C or Class F, a mix strength may be selected 110. The mix strength is the percent by weight of the expected admixture to be comprised of components other than the fly ash. The mix strength is preferably between about 0.15 and about 0.35, or between about 15% and 35%. Generally, a lower mix strength may be selected when the admixture is to contain Class C ash as opposed to class F ash.

After the mix strength is selected 110, a mix factor can be calculated 120, which in turn may be used to determine the weights of other admixture ingredients 130. The other admixture ingredients, besides the fly ash, preferably include gypsum, a first alkaline component and glass. The gypsum is preferably provided as a bit moist, having a moisture content of approximately twelve to sixteen percent, and more preferably about fourteen percent. The first alkaline component may be calcium oxide, quicklime, lime kiln dust, or a product known as Envirolime®. Envirolime® is available from Carmeuse Lime & Stone of Pittsburgh, Pa. The glass is preferably a powdered silica glass product, such as recycled glass that has been pulverized to a point where a majority of it has a particle size of less than 200 microns, and more preferably smaller than 105 microns, and most preferably less than 75 microns. Where a majority of the product has a particle size of less than 105 microns, at least seventy-five percent of the glass has a particle size of preferably less than 150 microns. Where a majority of the product has a particle size of less than 75 microns, at least seventy-five percent of the glass has a particle size of preferably less than 105 microns.

It has been found that the following equation, Eq. 1, may be employed to calculate the weights of ingredients of a cementitious admixture:

$$\text{Mix Factor} = S_{mix} - \frac{(\% \text{ CaO} + \% \text{ MgO})}{1 + \left(\frac{S_{mix}}{1 - S_{mix}}\right)}$$

Where $S_{mix}$ is the selected mix strength, and the % CaO and % MgO are the known concentrations of MgO and CaO of the fly ash sample, to be expressed in decimal form. From the mix factor (MF), the weights of the various mix ingredients, other than the fly ash, may be calculated 130 by the following equation, Eq. 2, for example:

$$MF = M_{gyp} * \left(\frac{W_{gyp}}{W_{ad}}\right) + M_{limealk} \left(\frac{W_{limealk}}{W_{ad}}\right) + M_{glass} * \left(\frac{W_{glass}}{W_{ad}}\right)$$

Where $W_{gyp}$, $W_{alk}$ and $W_{glass}$ are the respective weights of gypsum, the first alkaline component and the glass to be incorporated in the admixture. In the above equation, $M_{gyp}$, $M_{alk}$ and $M_{glass}$ are constant factors, less than or equal to the value of 1.0, that are assigned to the respective ingredients, where $M_{gyp}$ may be selected from about 0.20 to about 0.30, $M_{alk}$ may be selected from about 0.05 to about 0.85 and $M_{glass}$ may be selected from about 0.15 to about 0.40. Preferably, $M_{gyp}$ is about 0.25, $M_{alk}$ is about 0.10 to about 0.80, and $M_{glass}$ is about 0.20 to about 0.35. Generally, the M-factors represent the relativity of the cementitious nature of the various ingredients, and may generally be related to a calcium content of the material, if any. Where $W_{ad}$ is the weight of the admixture without the fly ash, but based on the mix strength. This can be calculated by the following equation, Eq. 3:

$$W_{ad} = W_{ash} * \left(\frac{S_{mix}}{1 - S_{mix}}\right)$$

Where $W_{ash}$, as the multiplicand, is the weight of the fly ash to be incorporated into the admixture and the other, and the multiplier is an intermediate factor. Thus, in the formula, the only unknowns that remain are the weights of the respective ingredients. However, the weights are generally preferably related. For instance, $W_{gyp}$ is preferably approximately equal to $W_{alk}$, and $W_{glass}$ is preferably approximately equal to about thirty to seventy percent of $W_{alk}$. Therefore, it is possible to directly relate any one of the weights to $W_{ad}$, and to calculate that weight from the mix factor, and then determine the remaining two weights. These ratios are not necessary, but preferred for Class F ash mixtures. For Class C mixtures, $W_{gyp}$ is preferably approximately equal to about twenty to about forty percent of $W_{alk}$, and $W_{glass}$ is preferably approximately equal to $W_{gyp}$. Generally, weight ratios may be altered, but are preferably kept within ranges so that the mix factor can be achieved as above.

Further, the admixture may include one or more adjunct ingredients. For example, a second alkaline component may be added to the mixture. This second alkaline component may be, for example, calcium oxide, sodium hydroxide or potassium hydroxide. Ordinary Portland cement can also be used as an alkaline contributor since it contains a high percentage of calcium oxide compounds. The M-factor of each of the calcium oxide and sodium hydroxide is 1.0. The second alkaline component can then be added as an additional augend on the right hand side of Equation 2. Thus, Eq. 2 could be summarized as the sum of each ingredient, besides the fly ash, M-factor multiplied by its corresponding concentration (% w/w) in the admixture, such as by the following equation, Eq. 4:

$$MF = \sum_{\substack{x=gyp,alk1,alk2,\\glass,etc.}} M_x * \left(\frac{W_x}{W_{ad}}\right)$$

When the respective ingredient weights have been determined the ingredients may be combined 140. Further, the ash may be combined with the other ingredients 150. Alternatively, the admixture may be provided without fly ash to be transported and later combined with fly ash. The admixture may additionally include some set retarder, which delays the set time of a cement that is later mixed with water. Such retarder has been found to not be necessary in carrying out the preferred embodiment of the invention.

The tables below describe various preferred cementitious admixture compositions using either Class C or Class F fly ash, although the classes may be mixed, as well, in which case averages of calcium oxide and magnesium oxide concentrations are utilized in order to calculate the mix factor using Equation 1.

Class C fly ash contains more calcium, which is believed to contribute significantly to its cementitious nature and has been preferred for use as an additive in cementitious products with Portland cement. Tables 1, 2 & 3 describe three preferred admixtures that utilize Class C fly ash.

TABLE 1

| Ingredient | % w/w admixture |
|---|---|
| Class C fly ash | 55-75 |
| Gypsum | Trace to 20 |
| First alkaline component | Trace to 20 |
| Powdered glass | Trace to 20 |
| Retarder | 0-2 |

TABLE 2

| Ingredient | % w/w admixture |
|---|---|
| Class C fly ash | 50-80 |
| Gypsum | Trace to 20 |
| First alkaline component | Trace to 20 |

TABLE 2-continued

| Ingredient | % w/w admixture |
|---|---|
| Second alkaline component | Trace to 15 |
| Powdered glass | Trace to 15 |
| Retarder | 0-2.5 |

TABLE 3

| Ingredient | % w/w admixture |
|---|---|
| Class C fly ash | 50-70 |
| Gypsum | Trace to 20 |
| First alkaline component | Trace to 20 |
| Powdered glass | Trace to 15 |
| Portland cement | Trace to 15 |
| Retarder | 0-2.5 |

Class F fly ash, on the other hand, more closely resembles volcanic ash. Tables 4, 5 and 6 describe three preferred admixtures using class F fly ash.

TABLE 4

| Ingredient | % w/w admixture |
|---|---|
| Class F fly ash | 50-65 |
| Gypsum | Trace to 25 |
| First alkaline component | Trace to 25 |
| Powdered glass | Trace to 15 |

TABLE 5

| Ingredient | % w/w admixture |
|---|---|
| Class F fly ash | 50-65 |
| Gypsum | Trace to 25 |
| First alkaline component | Trace to 25 |
| Second alkaline component | Trace to 15 |
| Powdered glass | Trace to 15 |

TABLE 6

| Ingredient | % w/w admixture |
|---|---|
| Class F fly ash | 45-55 |
| Gypsum | Trace to 25 |
| First alkaline component | Trace to 25 |
| Powdered glass | Trace to 15 |
| Portland cement | Trace to 25 |

Table 7, below, illustrates several preferred cementitious admixture formulations that have been formed and tested, where percentages are percent by weight (% w/w) of the admixture. The percentages in Table 7 are understood to be substantially accurate within normal errors of measurement, and not intended to be exact, or to require such exact percentages to fall within the scope of an embodiment of the present invention.

TABLE 7

| Mix Name | Class F Fly Ash | Class C Fly Ash | Gypsum | 1st Alk[1] | 2nd Alk[2] | Glass[3] |
|---|---|---|---|---|---|---|
| Admixture 1 | 65% | — | 15% | 15% | — | 5% |
| Admixture 2 | 65% | — | 15% | 15% | — | 5% |
| Admixture 3 | 65% | — | 5% | 20% | — | 10% |
| Admixture 4 | 60% | — | 15% | 15% | — | 10% |
| Admixture 5 | 60% | — | 10% | 15% | 5% | 10% |
| Admixture 6 | — | 55% | 15% | 25% | 5% | — |
| Admixture 7 | — | 55% | 10% | 20% | 10% | 5% |
| Admixture 8 | — | 55% | 10% | 10% | 25% | — |
| Admixture 9 | — | 55% | 5% | 25% | 10% | 5% |
| Admixture 10 | — | 55% | 5% | 25% | 10% | 5% |
| Admixture 11 | — | 55% | 5% | 25% | 5% | 10% |
| Admixture 12 | — | 55% | 5% | 25% | 5% | 10% |
| Admixture 13 | — | 65% | 10% | 18% | — | 7% |
| Admixture 14 | 55% | — | 10% | 30% | — | 5% |

[1]First alkaline component selected from the group consisting of calcitic lime kiln dust and dolomitic lime kiln dust, which may be Envirolime ®.
[2]Second alkaline component selected from the group consisting of calcium oxide and ordinary Portland cement.
[3]Glass component selected from the group consisting of (i) at least 75% of glass having an average particle size of less than 150 microns; and (ii) at least 75% of glass having an average particle size of less than 105 microns.

Figure 2:
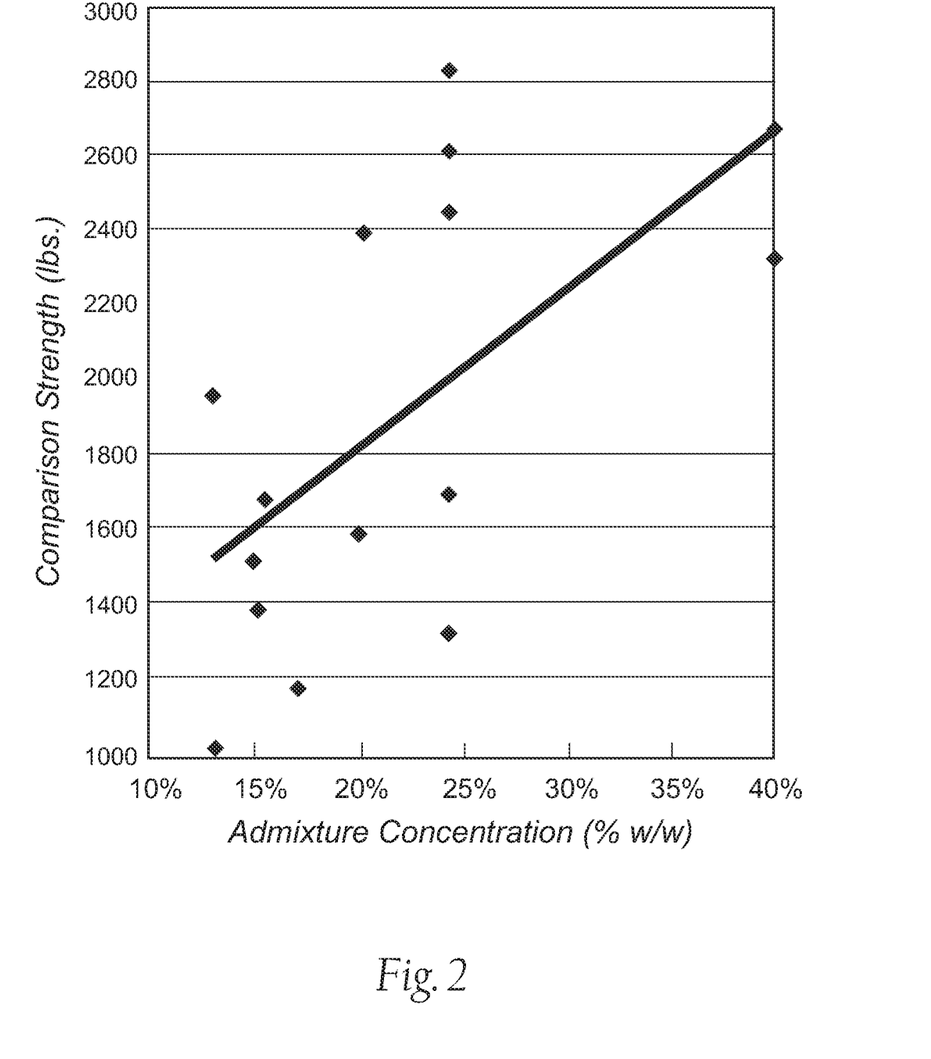
FIG. 2 is a plot of compressive strength of a concrete or mortar formed using a cementitious admixture according to the present invention versus the admixture percentage by weight (% w/w) of the concrete or mortar.

Once an admixture is formed, it may be used to form 160 a concrete blend further including sand, water and aggregate, or a mortar blend further including sand and water. A preferred range of Class C admixture usage in concrete or mortar is about fifteen to about thirty percent by weight (% w/w) of the concrete or mortar batch, while Class F admixture usage is preferably incorporated into concrete at about twenty to about thirty percent by weight (% w/w) of the concrete or mortar batch. As shown in FIG. 2, such percentages have been found to provide desired compressive strength of the resulting concrete or mortar. After the concrete or mortar has had a chance to set up, it may be tested 170. The compressive strength of the concrete or mortar may be measured by known methods. The sample may also be evaluated for color, efflorescence, trona (trisodium hydrogendicarbonate dihydrate), ammonia, expansion or contraction, unburned carbon and/or activated charcoal. Depending on the observation and the overall compressive strength performance, a determination may be made 180 as to whether the concrete or mortar has performed to desired specifications. If not, the admixture can be modified for the possibly unique properties of the ash. For instance, ingredient proportions may be varied at the step of the process at which the weights were calculated, while maintaining the same mix factor. Alternatively, the mix factor may be adjusted by selecting a different mix strength 110. Reiterated evaluation of concrete or mortar samples may then be performed until a preferred admixture is developed for a given ash or application. On the other hand, if the determination 180 is that the concrete or mortar meets desired specifications, the mix formula, e.g., respective ingredient weights, may be correlated 190 to the ash sample, which may have been assigned an identification number, so that the admixture may be reliably repeated for similar ash. Thus, a custom mix may be formulated for a fly ash having certain properties.

Figure 3:
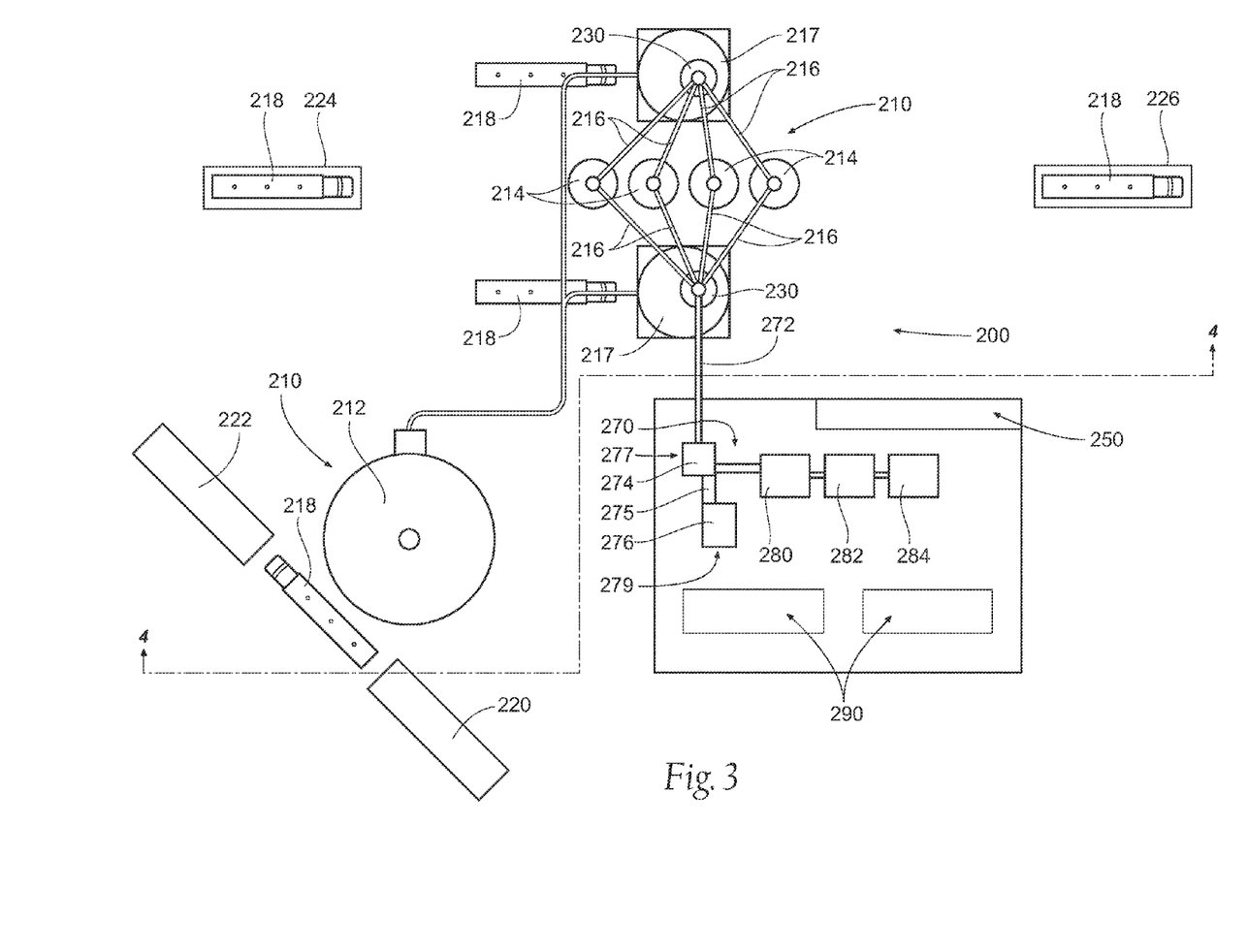
FIG. 3 is a schematic illustration of a cementitious admixture plant.
Figure 4:
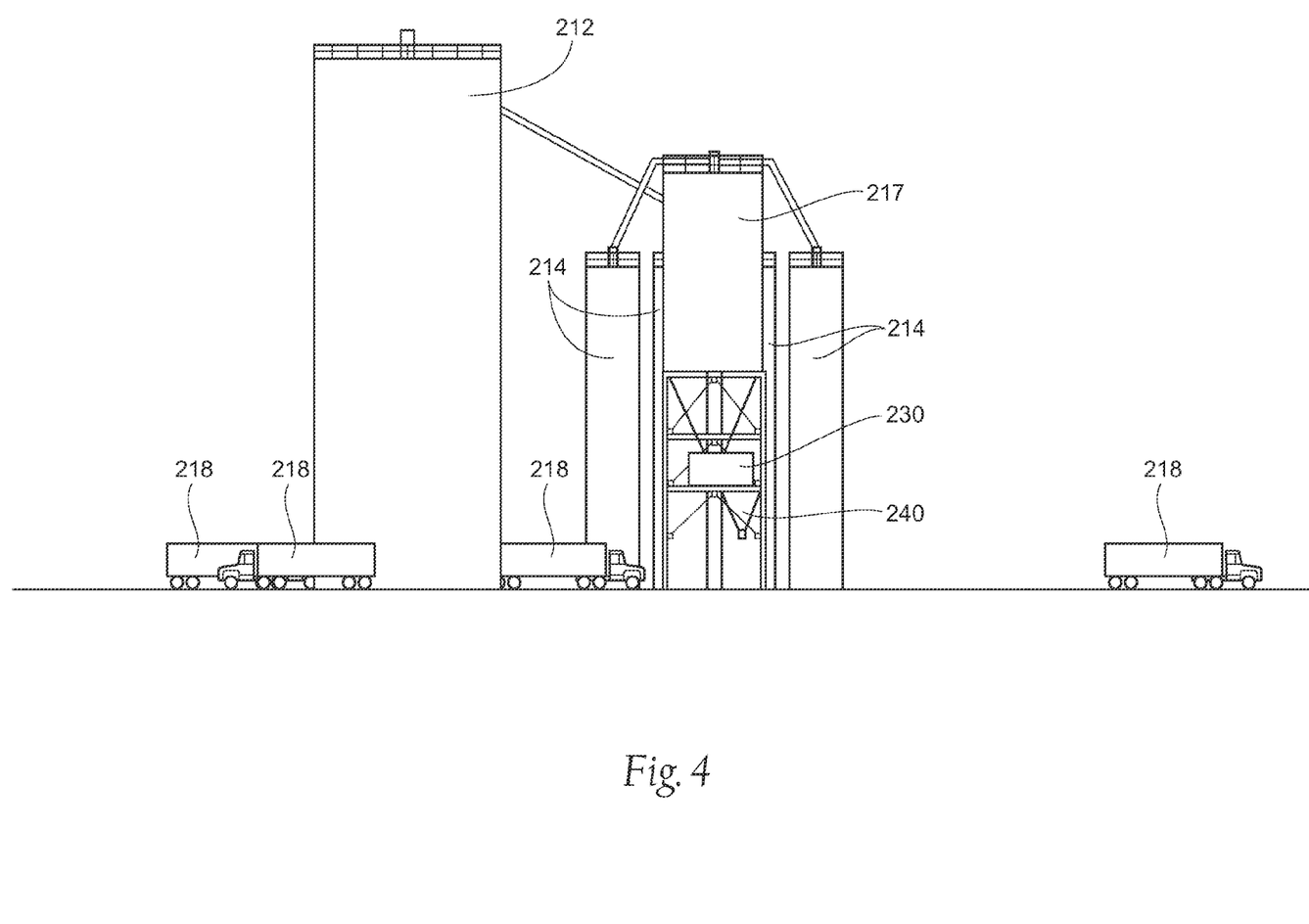
FIG. 4 is an elevation view taken along line 4-4 of FIG. 3.

Referring now to FIG. 3, an embodiment of an admixture plant 200 is depicted in plan view. Generally, the plant 200 includes raw material storage 210, material mixers 230, and system control components 250. The plant 200 may further include admixture packaging operations 270. The raw material storage 210 generally includes silos. A first silo 212, of which there may be a plurality at the plant 200, may be a ground mounted steel silo that is bolted together, capable of holding preferably up to about 10,000 tons of fly ash. While a single silo 212 could be used, especially if the plant 200 receives generally consistent fly ash, it may be desirable to provide a plurality of ash storage silos 212, where each silo 212 contains ash that may be significantly different from the other ash maintained onsite.

The other silo 214, of which there may be a plurality at the plant 200, is preferably smaller than the first type 212, and may be capable of holding up to about 250 tons of raw materials. The second silos 214 preferably include elevated conical or frustoconical bottom portions that provides a raw material gravity feed into individual screw conveyors 216, which convey the respective raw material product to a mixer 230 or weigh scale prior to being added to a mixer 230. The second silos 214 are preferably equipped with externally mounted air pads or other aeration devices such as air jets, which are capable of forcing air into the conical portions of the silo 214 to fluidize the raw materials to ease material handling. The second silos 214 also preferably include high and low level probes, such as ultrasonic probes as are known, so the respective fill level may be known or approximated, and an alert generated when the contents of the silos 214 should be replenished.

One or more of a third size silo 217 may be provided to be used as one or more fly ash batch silo. While the first silo 212 is used as a bulk receiving vessel for fly ash, the third silos 217 are used as smaller fly ash holding vessels prior to mixing. The silos 217 are preferably equipped with a high level probe, such as an ultrasonic or microwave probe, which may be used to shut off the pneumatic conveyor upon the silo 217 reaching a particular level of fly ash.

Fly ash is received into the first silo 212, preferably by pneumatic transfer, and other raw materials may be delivered similarly. Generally, a bulk tanker truck 218, such as those with a typical capacity of about 26 tons, carrying a raw, preferably powdered material, will arrive on site. The truck 218, or a portion thereof is weighed, such as by an in-ground mounted truck intake scale 220, before the truck offloads the material into the ash silo 212. This weight may be considered the arrival weight. The ash silo 212 preferably has a fill pipe to which a driver of the truck 218 can connect an output hose from the truck 218. Once the truck output hose is connected, the driver can turn on an air compressor included on the truck 218 and manually open the discharge gates to allow the dry material to be blown into the storage silo 212. Preferably, a plurality of trucks, such as up to four trucks, can be off-loaded at a time. When the truck 218 is empty, or when a desired amount of ash has been conveyed, the truck driver may proceed to a discharge scale 222, which may be the same or a different scale than the intake scale 220, and the truck 218 or same portion thereof is weighed again. This weight may be considered the exit weight. The difference between the arrival weight and exit weight, or a multiple thereof, determines a delivery weight, which is the amount of ash delivered to the silo 212. The delivery weight can be recorded and stored for inventory, reporting and billing purposes, as well as possible carbon credit tracking, as later described. When the fly ash needs to be conveyed from the first storage silo 212 to one of the fly ash batch silos 217, the operator/control 250 will enable the system, and the fly ash will be pneumatically conveyed via an above ground steel pipe.

With raw materials in place, a batch of admixture may be mixed, which may be controlled by an on-site computer. The fly ash batch silo 217 has a discharge valve mounted so as to allow gravity feed from the silo 217 to the associated mixer 230. The mixer 230 is preferably a concrete mixer, such as a Model 450 turbin mixer available from Mixer Systems of Pewaukee, Wis. Alternatively, the mixer 230 may be a planetary concrete mixer. The mixer 230 preferably rests on at least one floor mounted, load cell weighing device that provides an indication of the weight of product in the mixer 230. If a more accurate determination is desired, a plurality of load cell weighing devices may be used. A batching process may begin by allowing the fly ash to gravity flow down into the mixer 230 from the fly ash batch silo 217. When a target weight of ash is conveyed to the mixer 230, as indicated by the load cell weighting device(s), the flow of ash is stopped, preferably by an automated valve. Alternatively, the ash could be weighed prior to being placed in the mixer 230.

Other admixture ingredients are stored in the second silos 214. These ingredients may be added to the mixer 230, and the same load cell weighing devices may be used to determine weight of the materials added. However, more precise control may be provided by using a batch scale to measure a weight of the raw ingredients, in combination or separately, prior to addition to the mixer 230. The batch scale (not shown) may be provided as a steel hopper that sits generally above the mixer 230. Each screw conveyor 216 feeds raw material from one of the second silos 214 to the batch scale (not shown). While the raw materials may be combined in the batch scale hopper and weighed together, more control may be provided where each of the desired ingredients is weighed separately. When the desired material weight is determined by the batch scale, either comprising a combination of raw materials or a single material, a pneumatically operated butterfly discharge valve on the batch scale hopper will open thereby allowing the material from the batch scale hopper to proceed into the mixer 230.

Preferably before the material in the batch scale hopper is discharged into the mixer 230, the mixer 230 is powered on and steel mixing blades inside the mixer 230 start turning. When all admixture ingredients are discharged into the mixer 230, a timer is started and the mixer 230 will be allowed to run for a predetermined mix time, such as preferably between about one minute to about 4 minutes, and more preferably about two minutes. When the predetermined mix time has expired, the admixture is manually or automatically discharged out of the mixer 230, such as into a truck 218 or truck fill hopper. The mixer 230 may include a discharge door may be controlled by a pneumatic actuator controlled by an electronic solenoid valve that receives an electric signal from the control 250 before it opens the door. Each mixer 230 may further include two discharge doors, one to feed into the bagging operation 270 and the other to fill a truck or a 25 ton hopper below it that will fill the bulk trucks.

The plant 200 may include measurement, control, and reporting computerization, generally system control 250. System computerization is preferably provided by at least one electronic computer, which is preferably connected to a global computer network, such as the Internet. The computer may provide both remote real-time monitoring data as well as a control interface for remote analysis and management of plant systems. The system data may be accessed by or transmitted to a remote computer, where said remote computer accesses or receives such data from a plurality of control systems, each control system located at a different plant site.

One goal of the batching control system is to quickly and consistently produce a substantially uniform admixture. As discussed above, each fly ash source has the possibility of variations by coal source and unit configuration. Based on preliminary testing, a mix design may be customized for individual variations in ash, as described above. If the ash contains a high amount of calcium, the gypsum or first alkaline component might be reduced. If the ash has high efflorescence, the glass might be increased. Each ash sample is preferably assigned a specification number, as described in connection with step 190 in the process of FIG. 1. Since the mixture formula will have been associated with an ash specification number, the control 250 is able to automatically formulate an admixture recipe and control the various materials handling equipment to prepare a batch of admixture for transport.

All batching functions are preferably performed through an operator interface touch screen. The operator interface touch screen is the human machine interface to a programmable logic controller (PLC) which is operative communication with the various material handling controls of the plant 200. The touch screen can be used for entering ash specification number, mix designs, calibrating weighing scales, changing normal operating variables, and for operating the batching control system in either automatic or manual modes.

In an automatic mode, the control system 250 uses an ash specification number to produce a predetermined admixture. The measured ingredient weights may compensate for measured moisture in the ingredients. Automatic moisture compensation may be done on the aggregate bins that have the Hydronix Hydro-Probe 2 bin moisture probe installed into them. The batching control system 250, besides tailoring the admixture to the specified ash, may also be programmed to dynamically adjust for variations in raw materials, and may even be manually programmed, rather than use an assigned formula. The batching control 250 preferably can dynamically adjust for variations in raw materials, especially calcium content and unburned (LOI) carbon.

A batch of admixture can then transported to a redi-mix plant operator or directly to a job site in either bulk tankers, or in discrete packages such as 1 ton super sacs or 100 lb bags. At the redi-mix site or job site, the admixture is added to a large batch hopper to be combined with sand, gravel (aggregate) and water to produce concrete. The admixture may have been custom mixed for the specific fly ash which is locally available near a redi-mix site or job site. The concrete mixing system whether on the job site or at the redi-mix plant is preferably computer controlled to ensure that the concrete mix matches the specific fly ash specification, and the exact amounts of fly ash, mix, large and small aggregate plus water are mixed. Various setup parameters must be entered into the batching control system to allow it to automatically produce a desired admixture.

Once the mixing is completed, the admixture is preferably transferred to a loading hopper 240 located preferably generally below the mixer 230. A mixer discharge door will open and mixed material will fall out of the mixer 230 into the loading hopper 240. This hopper 240 preferably has an angled cone section at the bottom and is equipped with a discharge valve to fill the trucks 218. The hopper 240 is preferably located several feet off of the ground so that a truck 218 may comfortably pass beneath the discharge valve. A telescoping chute may extend downward from the hopper 240 to allow the admixture to fill the truck 218 through a charging port at the top of the truck or trailer. The truck may be resting on a load scale (not shown) and when the target weight is hit, the operator/control 250 closes the valve on the hopper 240 and stops the flow of product into the truck 218. Additionally or alternatively, the trucks 218 may be weighed by a loading intake truck scale 224 prior to being loaded with material and a loading exit scale 226 after being loaded with material. Subtracting the weight determined by the intake scale 224 from that determined by the exit scale 226 will provide a weight of admixture transferred to the truck 218. This weight, preferably expressed in tons or fractions of tons, may be used in calculating carbon credits, as explained further below. This hopper 240 is also preferably equipped with a low level probe, such as an ultrasonic or microwave probe, so that the operator/control 250 knows when the hopper is empty and needs material from the mixer 230.

Given the considerable variation of mixes and materials, a bagging system 170 has been designed to accommodate such variation. The system design may accommodate bulk processing for delivery to local batch redi-mix concrete plants. The delivery may be eased by packaging the admixture in containers rather than in bulk trucks. These containers may be paper bags or nylon or woven polypropelene bags, and may be labeled in metric or imperial units. The bagging system 170 can preferably accommodate 'super sacs' which are larger containers capable of containing approximately one ton of product.

When it is desired to provide admixture from the mixer 230 to the bagging operation 270, the operator/control 250 opens the mixer discharge door and more material will feed into the loading hopper 240 located below the mixer 230. This hopper 240, which is preferably vented for dust control, and possibly a second discharge door thereon, preferably feeds into an air slide, or air activated gravity conveyor, 272 that will convey the mixed product to the bagging operation 270. The air slide 272 has a flexible, rubber type membrane located inside of a steel housing that receives jets of air to liquidize the product and cause the product to be moved over to the desired location by gravity. The material will be discharged into one of two bagging hoppers, perhaps through a two position flop chute (not shown). A first bagging hopper 274 provides material for a paper bagging line and a second bagging hopper 276 provides material for the nylon super sac line. These bagging hoppers 274,276 are located above automatic bagging machines.

One automatic bagging machine 277 may be used to fill smaller bags and a second automatic bagging machine 279 may be used for 2000 lbs super sacks. To fill smaller bags, such as those holding just under 100 lbs. of material, a worker places a bag over the output of a valve, and the bag is supported by a horizontal platform, which in turn may interface to a weighing mechanism. A bag-in-place switch senses that a bag is in position and a valve automatically opens and fills the bag with a predetermined amount of material, such as 94 pounds. When the machine 277 senses the bag is to proper weight, it stops automatically, seals the bag and the horizontal platform pivots upwardly causing the bag to slide off of the platform and onto a moving conveyor. The platform may be pivoted by a pneumatic actuator. The conveyor transports the bag down line to a bag flattener 280. A bag flattener ensures the bags are fairly flat so they can be stacked economically onto a wooden pallet so all bags are substantially the same size and height. Conventional robotic palletizer 282 with bag pickup has steel fingers that grip the bag with rods and swings the bag over a pallet and drops them onto the pallet in the proper place. Once the pallet is full, it travels down another conveyor to an automatic shrink wrapper 284 that spins clear shrink wrap around the pallet ready for shipment.

To fill a super sac, generally provided with straps on the corners of the vessel, the sac is allowed to rest on the floor while being generally held upright with a forklift. Material is conveyed from the second bagging hopper 276 into the super sac. Once the bags are filled, they can be removed with a forklift and placed in the appropriate storage area 290, waiting to be loaded onto a truck for shipment out of the warehouse.

Besides creating usable cement from coal by-products that would otherwise likely be discarded, there also is a possibility of generating or tracking valuable carbon allowances, or carbon credits, due to the replacement of high carbon-dioxide-generating Portland cement and/or manufacture of carbon-dioxide-sequestering materials.

The current concept of carbon dioxide (CO2) allowances is based on a system created by the Clean Air Act of 1963 (Updated in 1970, 1990, 1993). Under certain proposed regulations, a coal-burning utility is given a base line, which is established by the amount of CO2 emitted per year prior to a given date. The amount allowed to be emitted may then be scheduled to be reduced. The utility can cut emissions to meet the reduction limits—but that would also mean cutting power production and revenues as well. Alternatively, the utility can pay a specified amount (current estimates are set in the range of $10-$15/ton) for the permission to burn more CO2 above the allowed cap.

The utilization of coal combustion by-products in the production of cement is similar to planting trees to reduce CO2. Just as every tree reduces the CO2 in the atmosphere, fly ash used in place of certain amounts of Portland cement (Ordinary Portland Cement, (OPC)) reduces the amount of OPC required. As stated above, OPC production releases approximately one pound of CO2 for every pound of OPC produced. Theoretically, a utility marketing its ash—if it were fully utilized—could claim OPC-related CO2 offsets. However, generally, the utility authorizes a fly ash marketer to take some or all of the ash production and 'market' it for any 'acceptable' use. Some utilities even have clauses in their ash marketing agreements requiring transfer back of carbon offsets—if generated. Unfortunately, many if not most of the uses of the fly ash are not replacing OPC and therefore are not carbon offset-generating uses.

The challenge in creating carbon offset credits from coal by-products is that the majority of uses for ash are CO2 neutral. In the present state of affairs in normal fly ash marketing, there are usually three parties involved, the utility (which would desire the CO2 allowances), the fly ash marketer—who buys from the utility and sells to a variety of customers, the third party. A customer, often a company in paving and highway construction, may use the same ash for soil stabilization, for flowable fill, roadbed preparation, or mix it in asphalt. None of such uses substantially offset CO2. Alternatively, the customer could mix it into cement as a replacement for OPC. This final use would generate CO2 offset credits, though depending on the quality of the fly ash, it is not at all clear how much offset say one ton of fly ash would represent in OPC replacement. Further, there are complications in tracking the use of fly ash and claiming carbon offsets. There is the opportunity for redundant claims, the possibility of poor estimates of OPC replacement and given the clear monetary value of the carbon offsets, even the possibility of fraud, as in a recent case in Europe where seven arrests were made in a suspected £38m carbon credit fraud, according to the London Telegraph, Aug. 19, 2009.

An embodiment of the present invention offers an alternative offset system virtually impossible for utilities, fly ash marketers and/or customer to replicate. First, an embodiment of a method according to the present invention may utilize substantially all fly ash received into cement. Thus, there is little possibility of miscalculation or fraud. Second, an embodiment of a method according to the present invention may include weighing processes to aid in documenting the contribution of raw materials and their sources, so there is redundant, tight accounting for the carbon allowance process. Also, an embodiment of a method according to the present invention may determine a ratio of equivalence between an admixture according to the present invention and OPC.

However, the system control 250 contains a preferably electronic database of the raw material sources, ingredients and final mixture quantities to demonstrate the amounts and probably qualify for carbon allowances.

Generally, as noted above, admixtures can be altered for various end use specifications and also mix ingredients. An accounting may be generated of expected carbon offsets or reductions. Such calculations are preferably based on the relative quality of the admixture. Some fly ash sources yield very strong cementitious admixtures which provide essentially a one-to-one by weight replacement of Portland cement. Other sources yield weaker cement which is required at 1.5 or even 2.0 times the quantity by weight of ordinary Portland cement.

One method that can be used to generate carbon offset credits, or to at least generate a carbon impact number, may begin by determining a benchmark Portland cement weight ratio required to produce a mortar having a desirable compressive strength, such as 1800 pounds per square inch. That is, a Portland cement percent by weight of a mortar mixture comprising Portland cement, fine aggregate (sand) and water is determined. Such analysis may be carried out according to current ASTM standards, such as ASTM C109 and related standards, such as to measure compressive strength of the mortars.

After a certain admixture according to the present invention has been formulated, an admixture weight ratio is determined, which is the amount of admixture that is required in a mortar mixture to obtain the same compressive strength as the mortar formed by the benchmark Portland cement weight. That is, an admixture percent by weight of a mortar mixture comprising the admixture, fine aggregate (sand) and water is determined. Once determined, the Portland cement weight ratio is divided by the admixture weight ratio to calculate a carbon offset factor. The production of one pound of Portland cement is thought to release approximately 0.90 to about 1.00 pound of carbon dioxide into the atmosphere. A carbon impact number may be generated by multiplying the carbon offset factor by a number between 0.90 and 1.00. This carbon impact number can then be used as a factor in determining carbon credits to be awarded to users of materials employing cementitious compositions, or to suppliers of raw materials therefore, or a combination thereof. For instance, a carbon offset value may be calculated by multiplying the carbon impact number by the number of tons of correlated cementitious admixture according to the present invention that is produced. Therefore, a given cementitious admixture according to the present invention may have a corresponding carbon impact number. That number can be multiplied by the weight of admixture, for instance at the time of loading of the admixture for use, to obtain a carbon credit value. The carbon credits may then be distributed according to a preferred methodology to the consumer of the admixture, the producer of the admixture, or the raw material suppliers, for exchange, trade, sale, or carbon dioxide offset purposes. Indeed, if the end use of the admixture is known, which may generally be as a Portland cement partial or complete replacement, accurate tracking of carbon dioxide production impact may be realized. The calculation of the carbon credit value may be contingent upon a comparison of the compressive strength of the mortar using the admixture to the compressive strength of the mortar using the Portland cement. For instance, if the compressive strength of the mortar using the admixture is at least ninety percent of the compressive strength of the mortar using the Portland cement, such strength may be adequate and substitution appropriate. Of course other percentages may be selected based different performance criteria, and if such percentage is not reached by the admixture mortar, then the admixture may be reformulated and the method repeated until desired results are achieved.

Thus, a method according to the present invention may be used to securely acquire fly ash and other essential admixture ingredients in such a manner which keeps all contributions and contributors documented. It may be assured that all ingredient contributions are utilized for OPC replacement, where such replacement may be calculated based on the efficacy of the final OPC replacement by compressive strength.

The foregoing is considered as illustrative only of the principles of the invention. Furthermore, since numerous modifications and changes will readily occur to those skilled in the art, it is not desired to limit the invention to the exact construction and operation shown and described. For instance, The admixture may be provided as a general cement, or as an admixture for use in various concretes such as pre-cast concrete, structural concrete, carbon dioxide sequestering concrete or aggregate, spray concrete. Portland-cement-free concrete, concrete bricks, volcanic ash cement, all of which may be tailored to accommodate regional fly ash variations. Also, possible cementitious ingredients include class F fly ash, class C fly ash, gypsum, lime, lye, Portland cement, lime kiln dust, volcanic ash, glass, trona, calcium carbonate, and cement kiln dust, and possible set retarders include rice hull ash, copula slag, cellulose fiber, bamboo fiber and filter cake. While the preferred embodiment has been described, the details may be changed without departing from the invention, which is defined by the claims.

We claim:

1. A method of forming a cementitious composition, the method comprising the steps of:
    determining an ash weight of a fly ash sample;
    selecting a mix strength of greater than or equal to 0.15 and less than or equal to 0.50;
    calculating an ash rate by subtracting the mix rate from 1.00;
    calculating a first intermediate factor by dividing the mix rate by the ash rate;
    calculating an admixture total weight by dividing the ash weight by the ash rate;
    calculating a mix weight by multiplying the total weight by the mix rate;
    calculating a rate adjustment factor by dividing a first ash factor less than one by the sum of one plus the intermediate factor;
    calculating a mix factor by subtracting the rate adjustment factor from the mix rate; and
    based on the mix factor, selecting a first weight of gypsum, a second weight of a first alkaline component and a third weight of glass, wherein the sum of the first weight, the second weight, and the third weight equals the mix weight.

2. A method according to claim 1, wherein the first ash factor was formed by adding a first number and a second number, wherein
    the first number is a the percent by weight of calcium oxide contained in the sample of fly ash, and
    the second number is a the percent by weight of magnesium oxide contained in the sample of fly ash.

3. A method according to claim 2, the method further comprising the step of combining the first weight of gypsum, the second weight of the first alkaline component and the third weight of the glass.

4. A method according to claim 2, the method further comprising the step of combining the ash weight of the fly ash sample with the first weight of gypsum, the second weight of the first alkaline component and the third weight of the glass.

5. A method according to claim 2, wherein the selection of the mix strength is based on a metal oxide content of the fly ash sample.

6. A method according to claim 2, the method further comprising the step of reviewing a report associated with the fly ash sample, the report providing the first number and the second number.

7. A method comprising the steps of:
    forming a first mixture by placing a first weight of fly ash, a second weight of gypsum, a third weight of a first alkaline component, and a fourth weight of glass in a mixer; and
    mixing the first mixture in the mixer to form an admixture.

8. A method according to claim 7, the method further comprising the step of placing the fly ash into the mixer prior to placing any of the gypsum, the first alkaline component and the glass in the mixer.

9. A method according to claim 8, the method further comprising the step of weighing the fly ash after it is transferred to the mixer.

10. A method according to claim 8, the method further comprising the steps of:
    weighing the gypsum before placing the gypsum in the mixer;
    weighing the first alkaline component before placing the first alkaline component in the mixer; and
    weighing the glass prior to placing the glass in the mixer.

11. A method according to claim 10, wherein the weighing the gypsum step, the weight the first alkaline component and the weighing the glass steps are all performed on a single scale.

12. A method comprising the steps of:
    forming a cementitious admixture comprising:
        greater than zero and less than about thirty-three percent by weight gypsum;
        greater than zero and less than about thirty-three percent by weight a first alkaline component comprising calcium oxide;
        greater than zero and less than about thirty-three percent by weight glass;
        greater than about forty-five and less than about seventy-five percent by weight fly ash; and
        up to about four percent by weight set retarder;
    forming a first mortar mixture consisting essentially of:
        a first cement weight of ordinary Portland cement;
        a first weight of water; and
        a first weight of sand;
    determining a first compressive strength of the first mortar mixture;
    forming a second mortar mixture consisting essentially of:
        a second cement weight of the cementitious admixture;
        a second weight of water approximately the same as the first weight of water; and
        a second weight of sand approximately the same as the first weight of sand; and
    determining a second compressive strength of the second mortar mixture;
    if the second compressive strength is greater than ninety percent of the first compressive strength, dividing the first cement weight by the second cement weight to calculate a carbon impact number.

13. A method according to claim 12, the method further comprising the step of multiplying the carbon impact number by a number of tons of the cementitious admixture to calculate a carbon credit value.

* * * * *